Aug. 18, 1942.  S. SCHNELL  2,293,564

SEALING MEANS

Filed April 29, 1940

INVENTOR
STEVE SCHNELL
BY
ATTORNEY

Patented Aug. 18, 1942

2,293,564

UNITED STATES PATENT OFFICE 2,293,564

SEALING MEANS

Steve Schnell, Overland, Mo., assignor to Wagner Electric Corporation, St. Louis, Mo., a corporation of Delaware Application April 29, 1940, Serial No. 332,213

6 Claims. (Cl. 309—33)

My invention relates to sealing means for fluid under pressure and more particularly a sealing means for cooperation with a groove to seal two relatively movable members, such as a piston and cylinder.

One of the objects of my invention is to produce an annular sealing element for positioning in a groove of a member to effectively and efficiently prevent fluid from passing between said member and another member with which there is relative movement.

Another object of my invention is to provide a sealing element of the type referred to which will not have its sealing effectiveness adversely affected in event of swelling of the yieldable material caused by the action of fluid thereon.

Figure 1:
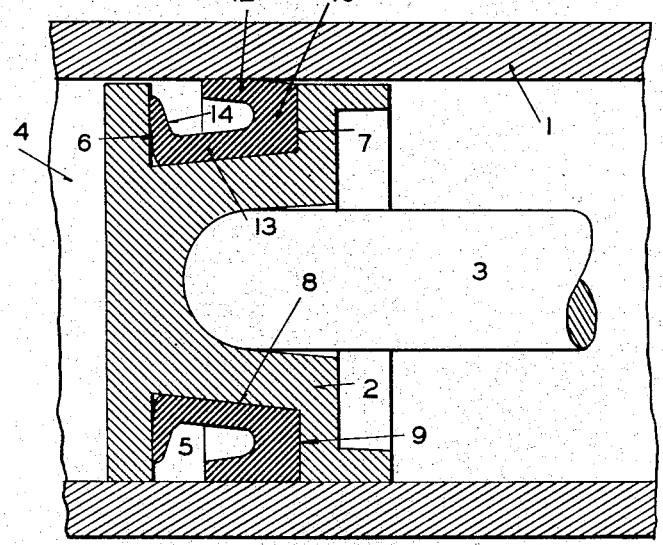
Figure 2:
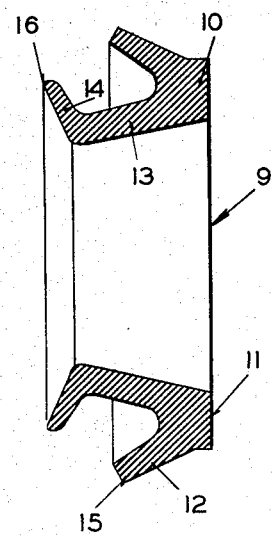
Figure 3:
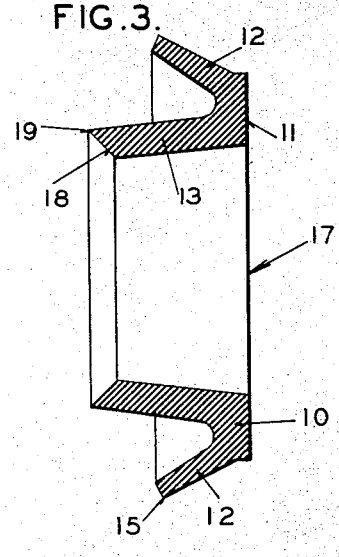
Figure 4:
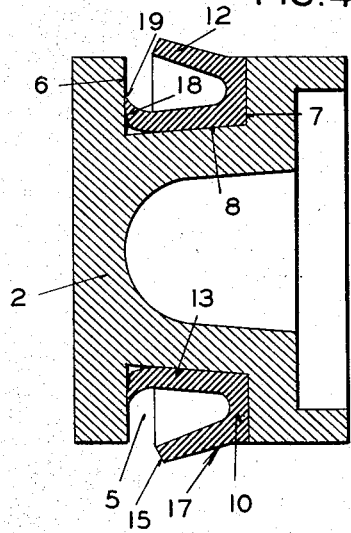

Other objects of my invention will become apparent from the following description taken in connection with the accompanying drawing in which Figure 1 is a sectional view of a piston and cylinder combination having associated therewith sealing means embodying my invention; Figure 2 is a sectional view of the sealing element showing its normal shape prior to being placed in position in the groove of the piston; Figure 3 is a sectional view of a slightly different form of sealing element and Figure 4 is a sectional view showing this modified sealing element positioned on the piston.

Referring to Figures 1 and 2, the numeral 1 indicates a cylinder in which is reciprocable a piston 2. This piston has associated therewith a member 3 which may be actuated by the piston if fluid under pressure is present in the chamber 4 ahead of the piston or may be employed to actuate the piston to cause the fluid in said chamber to be placed under pressure. The piston is freely slidable in the cylinder there being a slight clearance for this purpose.

The piston intermediate its ends is provided with an annular groove 5 having forward and rear walls 6 and 7 respectively which are shown as substantially perpendicular to the axis of the piston and a bottom wall 8 which is preferably at a slight angle to the piston axis as shown. My improved sealing element 9 for preventing fluid from escaping from the chamber 4 past the piston because of the normal clearance space is shown carried by this groove 5.

In accordance with my invention the sealing element is of annular shape and having a general U-shaped radial cross section, said element being preferably made of a suitable yieldable material such as rubber, synthetic rubber or the like. The base portion 10 of the element is of a radial thickness substantially equal to the depth of the groove adjacent the rear wall 7 and has a flat surface 11 for engagement with said wall. This base portion has integrally formed therewith an outer annular extension or lip 12 and an inner annular extension 13, the former being adapted to engage with the wall of the cylinder and the latter with the bottom wall 8 of the groove. The forward end of the extension 13 carries an integral tapered lip 14 which extends in an outward radial direction and engages the forward wall 6 of the groove.

The sealing element is normally moulded is shown in Figure 2. The outer extension of lip 12 is flared so that its outer peripheral edge 15 is of greater diameter than the diameter of the cylinder. This edge is relatively sharp and when the sealing element is in position on the piston and the assembly placed in the cylinder the lip will be flexed inwardly to thereby cause the edge to have pressure engagement with the cylinder to form a good seal. The pressure engagement will be increased when the fluid in the chamber 4 is under pressure since this fluid is also in contact with the inner surface of the lip due to the clearance permitting fluid to freely pass the forward end of the piston.

The tapered lip 14 on the end of the inner extension 13 is normally formed to extend forwardly as well as radially and the over-all axial length of the sealing element from the forward edge 16 on the lip 14 to the base surface 11 is made to be somewhat greater than the axial distance between the two walls 6 and 7 of the groove. This is an important feature of my invention for which the sealing element is mounted in the groove by stretching it over the forward end of the piston the lip will be flexed axially rearward and thus cause the edge 16 which is relatively sharp to have pressure engagement with wall 6. Thus a very effective seal will be made at this point to prevent fluid from passing between the wall 6 and the lip and thus force its way around the sealing element by way of the bottom 8 of the groove. The pressure engagement of the lip 14 with the wall 6 will be increased when the fluid is placed under pressure since this fluid will act in an axial direction on the lip 14.

With my improved sealing element no fluid can pass the piston. Both lips 12 and 14 normally will have pressure engagement with the surfaces they contact and thus make a good seal even if the fluid in the chamber is only under static head. When the fluid is placed under pressure the sealing effect of the lips will be increased in proportion to the fluid pressure since the fluid pressure will act on the lips to force them into tight engagement with the surfaces they contact. Another feature of my improved sealing element is that its sealing efficiency is not decreased by any swelling of the material of the element, in fact swelling will increase the sealing action. If the rubber or other material swells, the axial length of the element will increase and thus increase the pressure of the lip edge 16 on the wall 6. A similar increased pressure will be present at the lip edge 15 if the base 10 increases in a radial direction due to swelling. In prior constructions where the lip 14 was not present the swelling of the sealing element caused the extension 13 to increase in diameter and draw away from the bottom wall 8 thus permitting fluid when under static head to creep in between the extension and the bottom wall and then around back of the base of the sealing element. With the sealing lip 14 this condition cannot develop since if the extension 13 increases in diameter the edge 16 still remains in pressure engagement with wall 6, and as pointed out this pressure increases due to simultaneous swelling in an axial direction.

In the sealing element 17 shown in Figures 3 and 4 the general form is the same as that previously described and similar parts are designated by similar numerals. The end of the inner extension 13 instead of being normally provided with the lip 14 is provided with a beveled surface 18 to thus form a taped end having a relatively sharp edge 19. The over-all axial length of the element from the edge 19 to the base surface 11 is somewhat greater than the distance between the walls 6 and 7 of the groove in the piston so that when the sealing element is positioned in the groove the tapered end of extension 13 will be flexed rearwardly and also outwardly so that the edge 19 will be in pressure engagement with the wall 6 of the groove as shown in Figure 4. Thus there will be an effective seal formed and fluid under pressure can act on the tapered end to force it into tighter contact with the wall. Any axial lengthening of the seal due to swelling or the material will increase the pressure with which the tapered end engages the wall. The sealing element is placed in the groove by stretching it over the forward end of the piston.

Being aware of the possibility of modifications in the particular structures herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a cylinder and piston capable of having relative movement, one of said elements being provided with an annular groove in its surface the side walls of which are a fixed distance apart, and sealing means for cooperation with the groove and the wall of the other element comprising an annular packing element of yieldable material having a U-shaped radial cross section with one leg thereof lying adjacent the bottom surface of the groove, its base portion engaging the rear wall of the groove and its other leg engaging the wall of said other element, the axial length of the first named leg and base portion being normally greater than the fixed distance between the side walls of the groove, and the end of said leg being so formed as to be readily flexible with respect to the leg and toward the base portion whereby when the packing element is positioned in the groove the said axial length will be shortened by the flexing of the end and thus cause said end to have pressure engagement with the forward wall of the groove without any relative movement of the groove side walls.

2. In apparatus of the class described, a cylinder and piston capable of having relative movement, one of said elements being provided with an annular groove in its surface the side walls of which are incapable of relative movement, and sealing means for cooperation with the groove and the wall of the other element comprising an annular packing element of yieldable material having a U-shaped radial cross section with one leg thereof lying adjacent the bottom surface of the groove, its base portion engaging the rear wall of the groove and its other leg engaging the wall of said other element, the end of said first named leg having a lip portion extending substantially radially outward with its forward peripheral edge in pressure engagement with the forward wall of the groove as a result of the packing element being so normally formed that the axial length from the said peripheral edge to the base surface is greater than the distance between the fixed walls of the groove.

3. In apparatus of the class described, sealing means for association with a groove in a member the side walls of which are incapable of relative movement, said sealing means comprising an annular element of yieldable material adapted to be stretched over said member and positioned in the groove and having a general U-shaped radial cross section, the outer integral leg of said element extending forwardly and outwardly from the base portion and said inner integral leg extending forwardly and provided on its end with a tapered lip having a relatively sharp forward peripheral edge, the axial length of the packing element from said forward edge to the rear surface of the base portion being greater than the fixed distance between the side walls of the groove in which the base portion and the inner leg are adapted to be positioned.

4. In apparatus of the class described, sealing means for association with a groove in a member the side walls of which are incapable of relative movement, said sealing means comprising an annular element of yieldable material adapted to be stretched over said member and positioned in the groove and having a general U-shaped radial cross section, the outer integral leg of said element extending forwardly and outwardly from the base portion and said inner integral leg extending forwardly and provided on its ends with a substantial lip extending outwardly from the axis and also forwardly from the base portion and having a relatively sharp forward peripheral edge, the axial length of the packing element from said forward edge to the rear surface of the base portion being greater than the fixed distance between the side walls of the groove in which the base portion and the inner leg are adapted to be positioned.

5. In apparatus of the class described, a cylinder, a piston reciprocable therein and provided with an annular groove between its ends the side walls of which are a fixed distance apart, and sealing means for cooperation with the cylinder wall and the groove comprising an annular packing element of yieldable material having a U-shaped radial cross section with one leg thereof lying adjacent the bottom surface of the groove, its base portion engaging the rear side wall of the groove and its other leg engaging the cylinder wall, the axial length of the first named leg and base portion being normally formed so as to be greater than the fixed distance between the side walls of the groove, and the end of said leg being tapered so that it is capable of being readily flexed rearwardly with respect to the leg whereby when the packing element is stretched over the piston and positioned in the groove without relative movement of the side walls thereof the end edge of said tapered end will be caused to have pressure engagement with the said side wall as a result of flexing of said end and a shortening of said axial length.

6. In apparatus of the class described, a cylinder, a piston reciprocable therein and provided with an annular groove between its ends, and sealing means for cooperation with the cylinder wall and the groove comprising an annular packing element of yieldable material having a U-shaped radial cross section with one leg thereof lying adjacent the bottom surface of the groove, its base portion engaging the rear side wall of the groove and its other leg engaging the cylinder wall, the axial length of the first named leg and base portion being normally formed so as to be greater than the fixed distance between the side walls of the groove and the end of said leg being so formed that it is capable of being flexed axially whereby when the packing element is stretched over the piston and positioned in the groove said axial length will be shortened and the end will be caused to have pressure engagement with the forward side wall as a result of flexing of said end relative to the leg and without relative movement of the side walls, and the diameter of the outer end of the second leg being normally formed greater than the diameter of the cylinder so that when the packing element and piston are positioned therein said end will have pressure engagement with the cylinder wall.

STEVE SCHNELL.